May 24, 1966

N. T. GENERAL ET AL 3,252,352

HYDROKINETIC POWER TRANSMITTING MECHANISM

Filed Feb. 18, 1963

INVENTORS:
NORMAN T. GENERAL
PO-LUNG LIANG
BY ROBERT P. ZUNDEL
John A. Faulkner
& Donald J. Harrington
ATTORNEYS.

May 24, 1966  N. T. GENERAL ET AL  3,252,352
HYDROKINETIC POWER TRANSMITTING MECHANISM
Filed Feb. 18, 1963  5 Sheets-Sheet 5

INVENTORS:
NORMAN T. GENERAL
PO-LUNG LIANG
BY ROBERT P. ZUNDEL

ATTORNEYS.

United States Patent Office 3,252,352
Patented May 24, 1966

3,252,352
HYDROKINETIC POWER TRANSMITTING
MECHANISM
Norman T. General, Orchard Lake, Po-Lung Liang, Lincoln Park, and Robert P. Zundel, Wayne, Mich., assignors to Ford Motor Company, Dearborn, Mich., a corporation of Delaware
Filed Feb. 18, 1963, Ser. No. 259,272
10 Claims. (Cl. 74—645).

One invention relates generally to hydrokinetic power transmission mechanisms, and more particularly to a power transmission mechanism having a hydrokinetic torque delivery unit wherein provision is made for establishing a mechanical driving connection between the impeller and turbine members of the unit.

Our invention can be adapted readily for use in a multiple speed ratio power transmission mechanism of the type shown in co-pending application Serial Number 6,703, now Patent No. 3,095,755, filed in the name of James J. Duffy. This co-opending application is assigned to the assignee of our instant invention, and reference may be had thereto for the purpose of supplementing this disclosure.

It is conventional practice to provide a hydrokinetic torque converter unit and a multiple speed ratio gear unit in combination so that they are capable of providing multiple forward driving speed ratios and a reverse ratio. The impeller of the torque converter unit may be connected drivably to a vehicle engine, such as an internal combustion engine, and the turbine of the torque converter unit may be connected to a power input element of a multiple speed ratio gear unit. A driven member of the gear unit is connected drivably to the transmission power output shaft. The relative motion of the elements of the gear unit may be controlled by clutch and brake structure to establish shifts from one speed ratio to another and to adapt the mechanism for any given operating requirement. The clutch and brake structure for accomplishing such speed ratio changes includes clutch and brake servos that are fluid pressure operated. The operation of the servos in turn can be controlled automatically in response to control variables such as vehicle speed and engine torque demand.

The hydrokinetic torque converter unit multiplies the input torque as a toroidal fluid flow is established in the torus circuit defined by the impeller and turbine members. A reactor or stator is situated between the flow exit section of the turbine and the entrance section of the impeller to accommodate the hydrokinetic torque reaction and change the direction of the tangential fluid flow velocity vector before the flow enters the entrance section of the impeller.

When a relatively high speed ratio is achieved in the hydrokinetic unit, the torque reaction acting upon the stator diminishes to approximately zero. At this time the stator is permitted to freewheel in the direction of rotation of the turbine. When this occurs the hydrokinetic unit functions as a fluid coupling.

The fluid that circulates in the torus circuit of the hydrokinetic unit must absorb a considerable amount of energy in the form of heat when the differential speeds of rotation of the impeller and the turbine are high. The amount of energy absorbed by the fluid is decreased, however, as the speed ratio increases. But provision still must be made for maintaining a continuous circulation of fluid through the circuit for cooling purposes in order to maintain the fluid at a stabilized temperature.

The cooling requirements of the hydrokinetic unit and the static pressure that is necessary to maintain the hydrokinetic unit filled with fluid requires the use of a converter regulator valve. This converter regulator valve forms a portion of a converter fluid flow circuit that is semi-isolated from the circuit that includes the control valves and passage structure associated with the clutch and brake servos for the multiple speed ratio gear unit.

According to a principal feature of our invention, we have provided a clutch mechanism that is capable of establishing a mechanical driving connection between the impeller and the turbine of the hydrokinetic unit when the hydrokinetic unit operates in the fluid coupling range. This causes the impeller and the turbine to rotate in unison. Such a clutch structure eliminates the slip normally associated with hydrokinetic units of this type. It also eliminates the need for providing a continuous flow of cooling oil since the energy that must be absorbed by the fluid is reduced to zero as the slip between the impeller and the turbine becomes zero.

The clutch structure includes a shiftable member that is exposed to the static pressure of the fluid in the torus circuit of the converter unit. When the hydrokinetic unit is operating as a torque converter in the normal fashion, fluid is circulated in one direction through the torus circuit and is returned through a separate return flow path to a cooler. The flow then passes from the cooler to a sump where it again is picked up by the intake side of the control pump and returned to the circuit. The control pump may be engine driven or tailshaft driven. In the alternative, two pumps may be provided, one being driven by the engine and the other being driven by the tailshaft. The output sides of the pumps, however, are in fluid communication with a common portion of the circuit.

It is an object of our invention to provide a hydrokinetic power transmission mechanism wherein provision is made for clutching the impeller to the turbine to establish a mechanical torque delivery path between the engine and the torque transmitting gear units wherein the circuit pressure is utilized to establish a clutch engaging force.

It is another object of our invention to provide a lock-up clutch arrangement for a hydrokinetic unit of the type above set forth wherein clutching engagement may be accomplished by reversing the direction of the toroidal fluid flow through the hydrokinetic unit thereby initiating a redistribution of the static forces acting upon the pressure responsive member of the clutch structure.

It is another object of our invention to provide a hydrokinetic unit of the type above set forth wherein an automatic valve arrangement is providing for distributing fluid to the hydrokinetic unit and returning the same through a return flow circuit during operation of the hydrokinetic unit under high torque multiplication driving conditions, and which is capable also of reversing the direction of the toroidal fluid flow under cruising or coupling conditions.

It is a further object of our invention to provide a lock-up clutch structure of the type above set forth wherein the direction of the toroidal fluid flow passing through the hydrokinetic unit may be controlled to establish a distribution of pressure forces acting upon a fluid responsive member of the clutch structure that causes the clutch structure to assume an applied condition when the toroidal fluid flow is in one direction and establishes another force distribution upon reversal of the toroidal fluid flow thereby causing the clutch structure to assume a released condition.

Further objects and features of our invention will become apparent from the following description and from the accompanying drawings wherein.

*Description of converter and gear unit*

Figure 1:
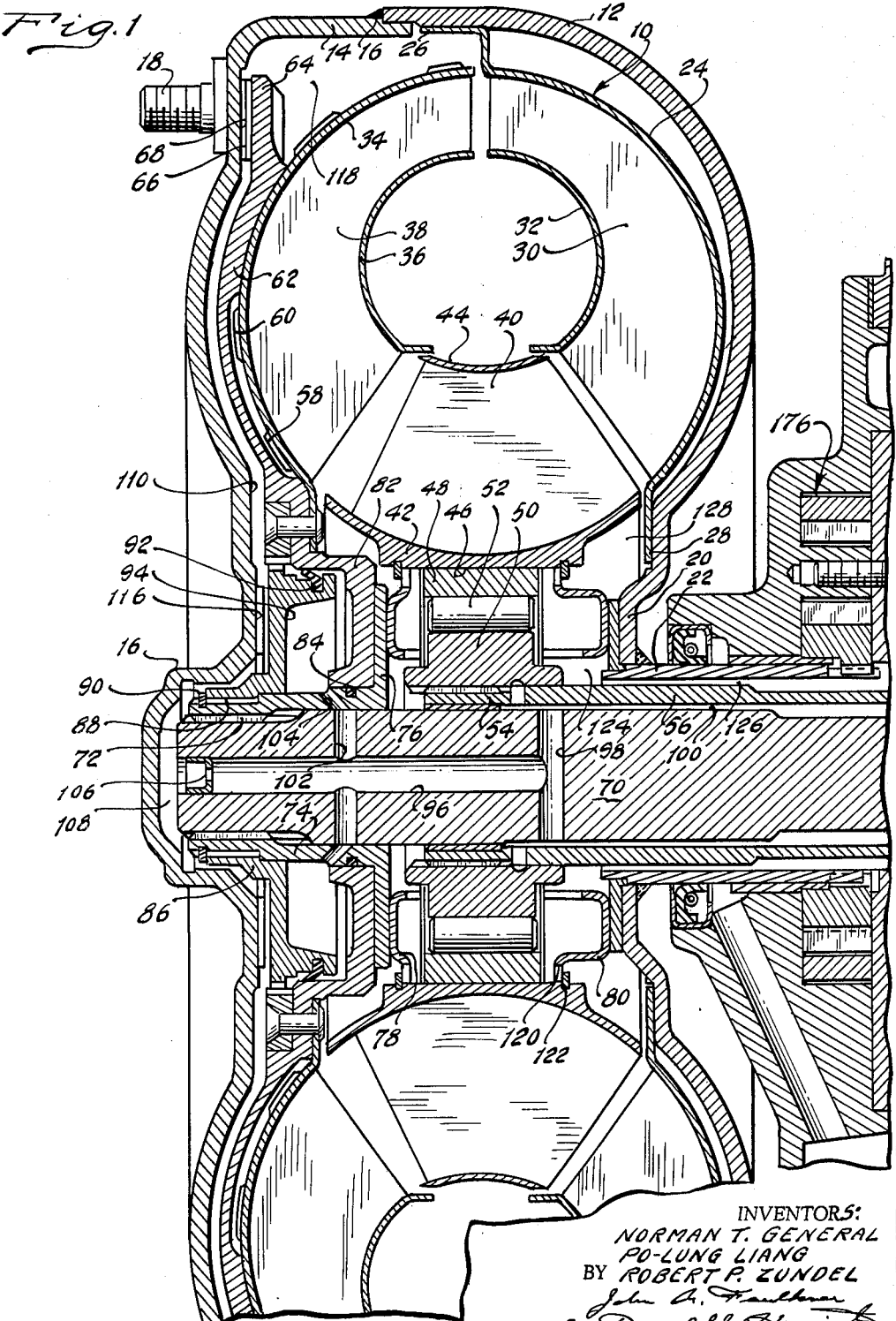
FIGURE 1 shows a hydrokinetic torque converter unit embodying the features of our invention.
Figure 2:
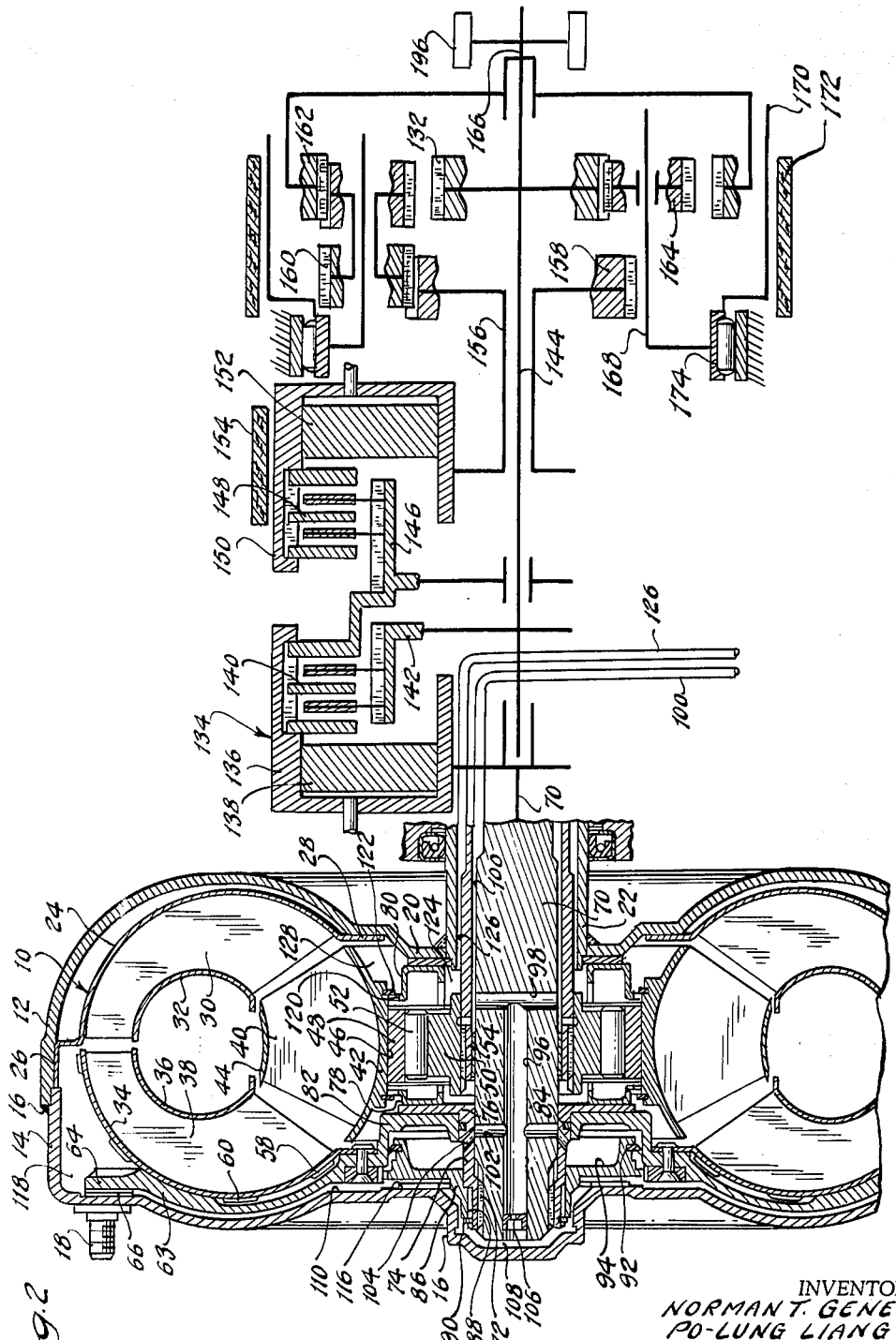
FIGURE 2 shows the converter unit of FIGURE 1 with a multiple speed ratio gear unit.

In FIGURE 1, a hydrokinetic torque converter unit is designated generally by reference character 10. It includes an impeller drive shell 12 that is connected at its periphery to the outer periphery of a drive shell 14, the connection being shown at 16. Drive shell 14 extends radially inwardly and includes a hub portion 16 that may be piloted within a cooperating recess in an engine driven crankshaft for an internal combustion vehicle engine. The outer peripheray of drive shell 14 carries bolts 18 to facilitate a driving connection with a drive plate that in turn may be connected drivably to the internal combustion engine crankshaft.

The impeller shell 12 is formed in an annular cavity and extends radially inwardly to a hub 20 connected to a sleeve shaft 22 which is journaled within a stationary portion of the mechanism. This portion may be a boss connected to the transmission housing. Disposed within the shelf 12 is an impeller outer race 24 which is secured at its outer periphery to the outer periphery of the shell 12. The connection, which is shown at 26, may be obtained by spot welding or by any other suitable technique. The radially inward periphery of the shroud 24 is welded or otherwise secured to the adjacent hub of the impeller 12. This connection is shown at 28.

Impeller blades 30 are situated between the shroud 24 and an inner shroud 32 and define radial fluid flow passages.

The impeller is situated in juxtaposed fluid flow relationship with respect to a turbine that includes an outer shroud 34, an inner shroud 36 and turbine blades 38 disposed between the shrouds 34 and 36. These blades 38 define also radial fluid flow passages and form a part of the torus circuit.

Situated between the flow exit section of the turbine and the entrance section of the impeller is a stator having blades 40. These blades are disposed between a first stator shroud 42 and a second stator shroud 44. Shroud 42 defines a hub that is apertured as shown at 46 to receive an outer race 48 of an overruning brake. This brake includes also an inner race 50. One of the races may be cammed to accommodate rollers 52 which permit over running motion of the stator in one direction but inhibit rotation in the opposite direction. Race 50 may be splined to a relatively stationary sleeve shaft 54 which extends axially as shown at 56. The extension 56 may be secured to the transmission casing.

The outer shroud 34 of the turbine is connected at 58 and 60 to a clutch member 62 which is formed with a shape similar to the shape of the turbine shroud 34. Located at the periphery of clutch member 62 is a clutch disc 64 having a friction surface or disc formed thereon. This disc is identified by reference character 66.

Situated adjacent disc 66 is a second friction surface or disc 68 that is carried by a cooperating portion of the periphery of drive shell 14 which in turn is mechanically connected to the vehicle engine crankshaft, as previously explained.

A turbine shaft 70 extends through the axis of the hydrokinetic torque converter unit. It is splined, as shown at 72, to an adaptor 74 having a radially extending portion 76. Thrust members 78 and 80 are disposed on either side of the races 50 and 48 for the stator and engage respectively the radial portion 76 and the hub 20 of the impeller shell 12. These members 78 and 80 accommodate thrust forces acting upon the stator.

Member 62 may shift axially in unison with the turbine. It is formed with a hub 82 which is arranged in sliding and sealing relationship with respect to the adaptor 74. A sealing ring 84 can be provided between the relative sliding surfaces of the hub 82 and the adaptor 74.

The adaptor 74 has connected thereto a cylinder member 86. This member 86 is splined, as shown at 88, to an extension of the adaptor 74. It also is loosely splined or keyed at 89 to the member 62. A snap ring 90 holds the member 86 axially fast with respect to the adaptor 74.

A lip type seal 92 is situated between the periphery of member 86 and the hub 82 of the piston member 62. The hub 82 and the member 86 cooperate to define a pressure chamber identified by reference character 94.

Turbine shaft 70 is formed with a pressure distributor passage 96 which communicates with a radial passage 98. This passage 98 in turn communicates with an annular passage 100 defined by the annular space between sleeve shaft 56 and the turbine shaft 70. A second radial passage 102 communicates with passage 96 and extends to a passage 104 which communicates with chamber 94.

The end of passage 96 is closed by a plug 106 which is apertured to permit restricted fluid flow between passage 96 and region 108 located in the hub 16 of the drive member 14.

Region 108 communicates with a radial flow passage defined by space 110 between member 62 and the radial portion of drive member 14. A thrust washer 116 is situated between member 86 and drive member 14.

Space 110 extends throughout the radial extent of the drive member 14 and communicates with the outer region 118 of the torus circuit through the annular space that normally is provided between the friction discs 66 and 68. The thrust member 80 located between the hub of the stator and the hub 20 of the impeller drive shell is formed with an opening 120. Member 80 is held axially fast by a snap ring 122. A corresponding snap ring is provided for the member 78 as shown. This opening 120 provides communication between the interior of the torus circuit and region 124 of the converter unit. This region 124 is in fluid communication with an annular passage that is formed by the annular space between stationary stator shaft 56 and the sleeve shaft 22 which supports rotatably the shell 12. This space is identified by reference character 126.

During operation of the hydrokinetic unit in the torque conversion range, fluid is distributed to the hydrokinetic unit through passage 100. It then passes through passage 98 and through passage 96 to radial passage 102. From there it is distributed to the chamber 94. Since the lip seal 92 is incapable of preventing transfer of fluid from the chamber 94 to a lower pressure region, fluid passes across the periphery of the lip seal 92 into the passage defined by space 110.

A portion of the supply fluid also passes through the orifice in member 106 and through region 108 to the region 110. Thus a parallel flow path is provided between passage 96 and the passage defined by space 110.

The combined flow then is distributed radially outwardly through the annular gap between friction clutch discs 66 and 68. The flow then enters the region 118 and passes through the gap between the impeller shaft 24 and the turbine shroud 34 to the interior of the shroud circuit. The flow then passes in a radially inward direction through the bladed passages of the turbine blades 38 and then through the bladed passages of the stator blades 40. The return circuit for this flow is defined in part by the gap between the stator shroud 42 and the impeller shroud 24. The flow passes through this gap into region 128 and then through opening 120 which communicates with region 124. Flow is returned then through passage 126.

During operation in the torque conversion range, it will be apparent that the static pressures acting upon member 62 are balanced. That is, the static pressure forces acting in the left hand direction are opposed and balanced by the static pressure forces acting in the opposite direction.

During operation of the mechanism in the coupling range, the clutch may be engaged by reversing the direction of the toroidal fluid flow. Under these conditions, fluid will be supplied through passage 126 rather than passage 100. The converter fluid flow will pass from passage 126 through member 80 and then through opening 120 in the region 128. Fluid then passes through the annular gap provided between stator shroud 42 and impeller shroud 24. It then passes in a radially outward direction through the bladed passages defined by the impeller blades 30. There will be a tendency therefore for the fluid to pass into the region 118 and through the annular space defined by the friction discs 66 and 68. The fluid may not pass, however, in a right hand direction past the lip seal 92. Therefore, the chamber 94 will not be pressurized with circuit pressure. It instead will be subjected to the pressure that exists under these conditions in passage 96.

The flow that passes radially inwardly across the friction discs 66 and 68 and through space 110 will be forced to pass through an orifice in plug member 106. A slight pressure drop is established by reason of this flow. Therefore, the static pressure forces acting in a left hand direction upon clutch member 62 will be greater than the corresponding pressure forces acting upon the member 62 in a right hand direction. In other words, the pressure in the chamber 94 will be less than the static pressure that exists in the torus circuit. This then will tend to shift the member 62 and the turbine in a left hand direction thereby causing frictional engagement of the discs 66 and 68.

As soon as engagement is established, flow through the passage defined by space 110 is interrupted. Thus the pressure in space 110 immediately assumes a value substantially less than the circuit pressure. Therefore, immediately upon engagement of friction discs 66 and 68, a considerable augmentation in the clutch apply force will be obtained. The effective force then created for clutch engaging purposes is equal to the circuit pressure times the entire annular area of the member 62. This force is sufficient to maintain a driving relationship between the impeller and the turbine of the hydrokinetic unit. Once clutch engagement is established, the hydrokinetic unit no longer forms a portion of the torque delivery path of the power transmission mechanism.

The turbine torque delivered to shaft 70 is distributed initially to a power input sun gear 132 of a planetary gear unit. The connection between shaft 70 and gear 132 is established by a clutch identified by reference character 134. This clutch includes an annular cylinder 136 within which is situated an annular piston 138. Multiple clutch discs of a multiple disc clutch assembly 140 are splined to member 136. Cooperating friction discs of the assembly 140 are connected to a clutch member 142 which is connected drivably to an intermediate shaft 144.

Cylinder 136 is connected also to a clutch member 146 that carries in driving relationship clutch discs of a second multiple disc clutch assembly 148. Cooperating discs of this assembly are carried drivably by a second clutch drum 150 which defines an annular cylinder within which an annular piston 152 is situated. A brake band 154 circles member 150 and may selectively anchor the same as fluid pressure is admitted or exhausted from the pressure sensitive region of its brake servo.

Member 150 is connected drivably to sleeve shaft 156 which in turn is connected drivably to a second sun gear 158. This second sun gear engages a long planet pinion 160 which meshes with the ring gear 162. By preference, three of the pinions 160 are provided, and they each mesh with secondary pinions 164 which drivably engage sun gear 132. Ring gear 162 is connected drivably to power output shaft 166.

Pinions 160 and 164 are rotatably supported by a common carrier 168 which in turn forms a portion of a brake drum 170 about which is positioned a brake band 172. An overrunning brake 174 establishes a one-way connection between brake drum 170 and carrier 168.

To establish the lowest speed ratio operation, clutch disc assembly 140 is engaged. Thus turbine torque is delivered to sun gear 132. Brake band 172 is applied and the carrier 168 therefore acts as a reaction member. Ring gear 162 and driven shaft 166 thus will rotate in the same direction of rotation as the turbine shaft, but at a substantially reduced speed ratio. In the alternative, reaction torque may be accommodated by overrunning brake 174.

To establish intermediate speed ratio operation, brake band 154 is applied. Thus sun gear 158 functions as a reaction member. Carrier 168 then will overrun if the brake band 172 is released. Driven shaft 11 then will be driven at an intermediate speed ratio less than unity but greater than the low speed ratio.

To establish high speed or direct drive operation, brake band 154 is released and both clutch disc assemblies are applied simultaneously. This locks up the sun gears 158 and 132 for rotation in unison. Thus driven shaft 166 will be driven at the same speed as turbine shaft 70.

The control valve structure for establishing the previously described ratio changes comprises a pump 176 which can be driven by the vehicle engine. The intake side of the pump communicates with a sump 178 which may be defined by a lower portion of the transmission casing. Pump 176 communicates through a discharge passage 180 with a main regulator valve 182. This valve maintains a pressure in the circuit tha is sufficient to apply the clutch and brake servos during speed ratio changes and is sensitive to changing driving conditions such as engine torque demand and vehicle speed.

The regulator valve 182 functions as a controlled by-pass valve mechanism for regulating the rate of by-pass of pressurized fluid from the pump 176 to the sump 178. The output pressure of the regulator valve 182 is distributed through a passage 184 to a manual selector valve 186. The regulated output of the main regulator valve 182 is distributed also to a converter regulator valve through a passage 188.

The operator may select reverse drive range, either of two forward drive ranges or neutral by appropriately manipulating the selector valve 186.

If it is assumed that the operator has conditioned the manual valve for forward drive operation, pressure will be distributed from the manual valve 186 to a control pressure passage 190 which communicates with a 2–3 shift value 192 and a 1–2 shift valve 194. Each shift valve 192 and 194 is subjected to governor pressure and torque demand pressure. Governor pressure is obtained by a governor valve 196 which may be connected drivably to the driven shaft 166. It is capable of producing a governor pressure in passage 198 which is sensitive to the speed of rotation of shaft 166. This governor pressure is distributed by passage 198 to both valves 192 and 194. Control pressure is supplied to the governor 196 through a governor supply passage 200 which communicates with the control pressure passage 190.

A throttle valve 202 is situated in the control circuit, and it functions in response to changes in engine intake manifold vacuum. For this purpose a manifold vacuum pressure servo 204 is provided. Valve 202 is supplied with control pressure through a passage 206 and modulates it in response to changes in manifold pressure to produce a manifold pressure sensitive signal in passage 208. The signal is distributed to a boost TV valve that modulates control pressure distributed thereto through passage 210 to produce a resultant output signal in passage 212 that is an indicator of engine torque demand.

The engine intake manifold sensitive pressure in passage 208 is distributed to a compensator valve 214 through a passage 216. Compensator pressure valve 214 is subjected also to governor pressure by means of a passage 218 that communicates with governor pressure passage 198. Control pressure from the main regulator valve is distributed to the compensator valve 214 through a passage 220. This control pressure is modulated in response to changing governor pressure and throttle valve pressure to produce a resultant pressure in passage 222 which is referred to as a compensator pressure. This compensator pressure acts upon the main regulator valve to modify the regulating characteristics thereof in response to changing torque demand and vehicle speed.

The 2–3 shift valve and the 1–2 shift valve each are subjected to boost TV valve pressure through passage 224. This passage communicates with a passage 226 which extends to each valve 192 and 194. Disposed between passages 224 and 196 is a TV modulator valve 228 which modifies the pressure signal before it passes through passage 226. The signal in passage 226 then is reduced by a predetermined amount before it is made available to the shift valves.

When the governor pressure signal for any given engine intake manifold pressure is sufficiently high, the 1–2 shift valve will establish communication between passage 190 and a passage 230 which extends to the servo for brake band 154 to apply the same. Passage 232 is provided for this purpose. The front clutch disc assembly 140 is energized continuously during forward drive operation by reason of the distribution thereto of control pressure from the manual valve through passage 234.

During operation in the low speed ratio range, the rear servo for brake band 172 may be energized continuously by reason of the distribution thereto of control pressure from the manual valve through passage 236. As soon as the brake band 154 is applied, however, intermediate speed ratio is established by reason of the overrunning brake 174 which permits overrunning motion of the carrier with respect to the transmission housing 170.

Upon a further increase in vehicle speed for any given engine intake manifold vacuum, the 2–3 shift valve 192 will establish fluid communication between passage 190 and a passage 238 which extends to the servo for the multiple disc clutch assembly 148. Fluid pressure is distributed simultaneously to the release side of the front brake servo for brake band 154. Thus since both clutches are applied, the mechanism is conditioned for direct drive operation.

The vehicle operator controls the engine throttle by an accelerator pedal indicated generally at 239. A mechanical connection may be established between pedal 239 and the downshift valve 240. Upon movement of the engine throttle to a wide open position, the valve 240 establishes a connection between control pressure passage 242 extending from the manual valve and a downshift pressure 244.

Passage 244 communicates with the 2–3 shift valve 192 through a passage 246. It communicates also with the 1–2 shift valve 194 through a passage 248. Thus both the shift valves are moved to a downshift position at vehicle speeds that are higher than that which would be required for a normal downshift.

For a more complete description of the automatic control valve circuit, reference may be made to application Serial Number 6,703 as previously mentioned.

*Description of converter flow valve system*

The valve system that is employed for reversing the direction of the converter feed now will be described. The converter pressure regulator valve is identified generally by reference character 250 and includes a multiple land valve spool 252 having spaced valve lands 254, 256 and 258. Spool 252 normally is urged in a left hand direction as viewed in the drawings by a valve spring 260.

Passage 188 for the main regulator valve communicates with a port 262 located in a valve chamber within which the spool 252 is situated. This pressure acts upon a differential area defined by the valve lands 254 and 256 to urge normally the valve spool 252 in a right hand direction in opposition to the force of spring 260. A controlled by-pass then is established between port 262 and an outlet port 264 which communicates with the inlet side of the pump 176. Thus, the regulating characteristics of the converter regulator valve 250 are determined in part by the calibrated spring 260. The regulating characteristics are determined also, however, by the magnitude of the compensator pressure in passage 222. Upon an increase in engine torque for any given vehicle speed, a reduction in compensator pressure will be experienced. This will result in an increase in the pressure that is made available to the outlet passage 266 for the converter regulator valve. On the other hand, a decrease in engine torque demand for any given vehicle speed will result in an increase in the compensator pressure thereby establishing a decrease in pressure in passage 266. An increase in vehicle speed for any given manifold vacuum will result in a decrease in the pressure in passage 266 and a decrease in speed for any given engine manifold vacuum will result in an increase in pressure in passage 266.

A lube pressure passage 268 communicates also with the valve chamber for the converter regulator valve and the pressure therein is controlled by valve spool 252. Pressure is made available to passage 268 prior to the time port 264 is uncovered by valve land 256 upon a build-up in pressure on the discharge side of the pump 176.

A signal valve capable of reversing the direction of flow through the torque converter is indicated generally by reference character 270. It includes a multiple land valve spool 272 disposed within a cooperating valve chamber. Spool 272 is formed with spaced valve lands 274, 276, 278, 280 and 282. Passage 266 extending from the output side of the converter regulator valve communicates with three branch portions identified respectively by reference characters 284, 286 and 288.

A cooling oil return passage 290 communicates with the valve chamber for the signal valve spool 272 at a location between branch passages 284 and 286. Converter fluid flow passage 126 communicates with the signal valve spool chamber at a location between branch passage 284 and passage 290. Converter fluid flow passage 100 communicates with the signal valve spool chamber at a location adjacent branch passage 288. A feed back pressure passage 292 communicates also with the signal valve spool chamber at a location adjacent branch passage 286. This passage 292 extends back to the converter regulator valve chamber and communicates with a differential area that is defined by valve lands 256 and 258. If passage 292 is pressurized, a pressure force will be established on this differential area thereby tending to urge the regulator valve spool 252 in a left hand direction as view in the drawings. This normally would tend to augment the action of the spring 260 to increase the regulated pressure level in passage 266.

Valve spool 272 normally is urged in a right hand direction, as viewed in the drawings, by a valve spring 294 which is located in the left hand end of the valve chamber. Communicating also with the valve chamber is a reducer valve chamber 296 within which is positioned slidably a reducer valve 298. A spring 300 is situated between valve 298 and valve spool 272. The left hand end of the valve chamber 296 communicates with TV boost pressure passage 212. Chamber 296 communicates also with the left end of the chamber for valve spool 272 through a cross over passage 302. Thus valve 298 will reduce the magnitude of the pressure in passage 212, and the reduced pressure then is made available to the chamber occupied by springs 300 and 294.

Downshift valve pressure passage 244 communicates with the chamber occupied by springs 294 and 300. A branch passage is provided for this purpose. The pressure in passage 244 also acts upon the differential area defined by valve lands 280 and 282, thus tending to shift the valve spool in a right hand direction. Passage 244 is pressurized, however, only when the vehicle operator advances the engine throttle to a fully opened position.

Figure 3:
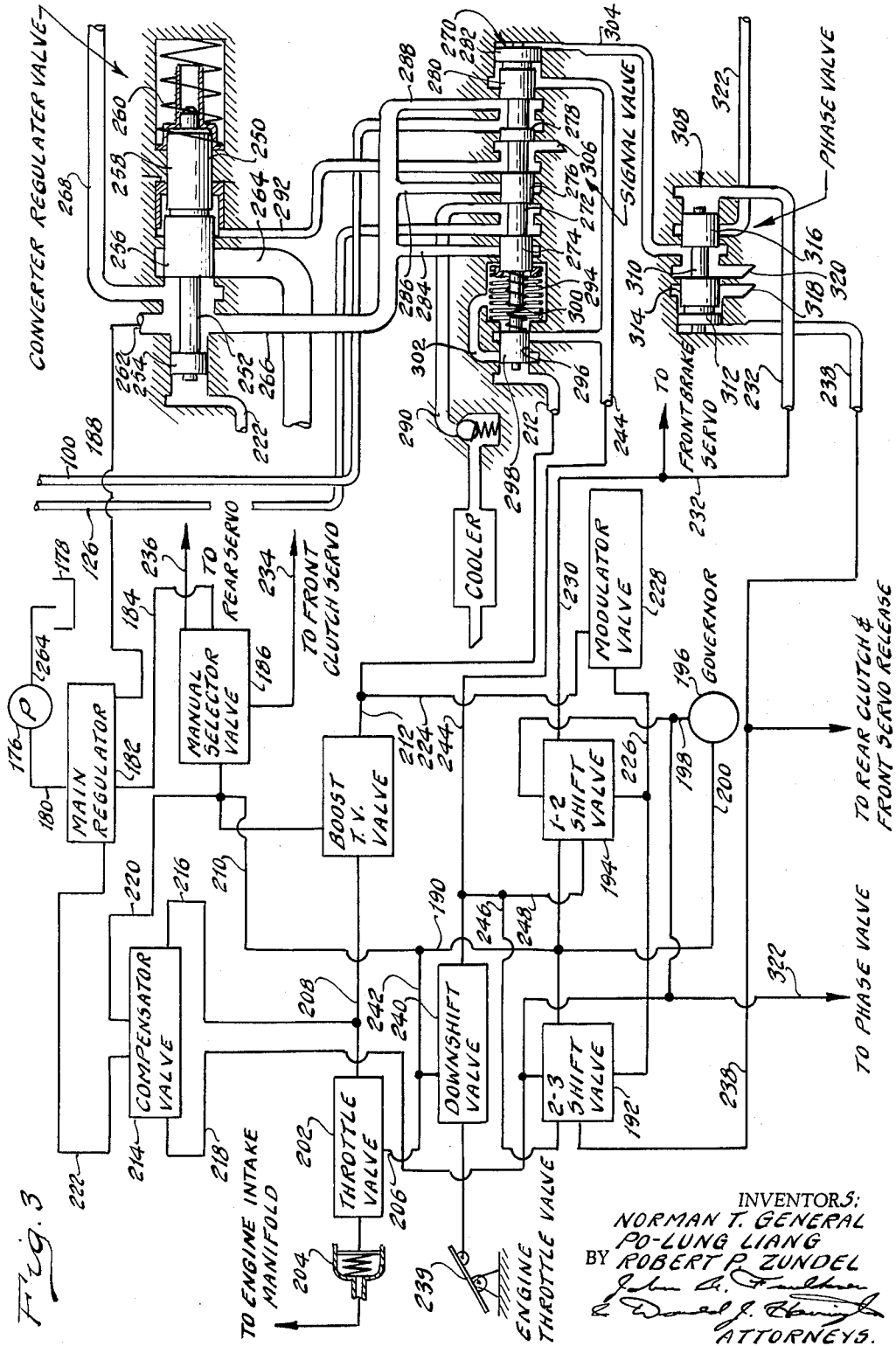
FIGURE 3 shows a valve circuit capable of controlling the lock-up clutch structure shown in FIGURE 1.

Governor pressure is caused to act upon the right hand end of valve land 282. Passage 304 distributes governor pressure to the signal valve for this purpose. The signal valve spool 272 therefore functions in response to variations in governor pressure or boost TV pressure. If the valve spool 272 assumes the position shown in the drawings, land 274 will block passage 284 and valve land 276 will block branch passage 286. Furthermore, communication will be established between passage 126 and passage 290, and between passage 100 and branch passage 288. Communication also will be established between feed back pressure passage 292 and an exhaust port 306. Under these conditions converter fluid will be supplied from passage 266 through the signal valve fluid passage 100 thereby causing the lockup clutch structure to be disengaged. If the governor pressure increases for any given value for the boost TV pressure, spool 272 will be shifted in a left hand direction so that passage 290 will be blocked by land 276. Furthermore, branch passage 288 will be blocked by land 280 and passage 100 will be open to exhaust port 306. Valve land 280 is slightly larger than valve land 278 so that the pressure in passage 288 will tend to urge the valve spool 272 in a right-hand direction when the valve spool assumes the position shown in FIGURE 3. As it is shifted, however, the differential area defined by these valve lands is exhausted through port 306. This introduces a hysteresis feature for any given engine torque demand. Therefore the valve spool will return to the position shown in FIGURE 3 only after the vehicle speed is reduced to a value less than the vehicle speed at which the valve spool was shifted in the first instance.

Branch passage 284 will be brought into communication with passage 126 and branch passage 286 will be brought into communication with feed back pressure passage 292. The circulation of fluid through the converter then is reversed and a pressure differential then is experienced across the opening defined by the separated friction discs 66 and 68. This pressure differential creates a clutch energizing force that urges the clutch member 62 into engagement. As soon as this occurs, a fluid flow lock is established in the converter torus circuit since the outlet fluid flow is interrupted. The pressure acting upon the left hand side of the clutch member 62 is substantially zero since passage 100 is exhausted through port 306, as explained previously. In interruption of fluid flow through the converter during operation with the lock-up clutch engaged does not result in overheating of the fluid since the torque is distributed through the clutch structure rather than through the hydrokinetic circuit.

In order to maintain the lock-up clutch in engagement following actuation of the signal valve, the pressure in in passage 292 results in a pressure build-up in passage 266. This occurs by reason of the supplemental fluid pressure force acting upon valve spool 252. Under certain conditions, however, it may not be necessary to provide such a feed back pressure passage.

We have provided a phase valve as shown at 308 for the purpose of preventing operation of the signal valve under conditions when engagement of the lock-up clutch is not desired. The phase valve includes a valve spool 310 having valve lands formed thereon as shown at 312, 314 and 316. Valve spool 310 is urged in a left hand direction as viewed in the drawings by the pressure that exists in passage 232. This pressure is the same pressure that acts upon the apply side of the front brake servo. Acting upon the left side of the valve spool 310 is rear clutch pressure which is distributed thereto through passage 238. A pair of exhaust ports is shown at 318 and 320.

The diameter of land 312 is greater than the diameter of land 316. Thus when passage 238 experiences a pressure build-up that approaches the pressure in passage 232, valve spool 310 will shift in a right hand direction. This establishes communication between passage 304 and the governor pressure supply passage 322. This passage 322 communicates with passage 218 described previously.

The governor pressure then is capable of influencing the signal valve only in those instances when the rear clutch is pressurized and the front brake servo is released. The shift point at which the signal valve will be operated can be calibrated suitably depending upon the operating characteristics for the lock-up clutch that are desired.

Figure 4:
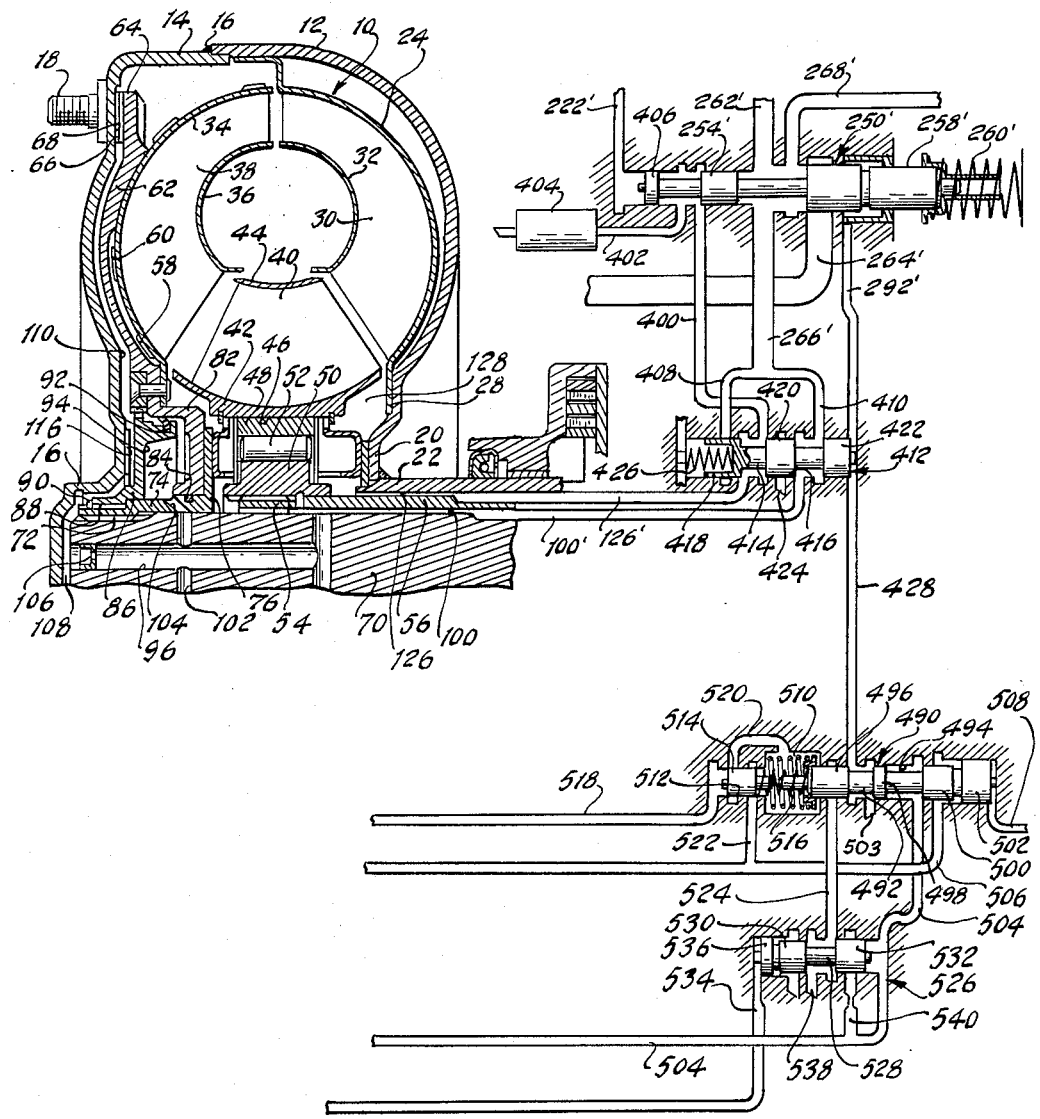
FIGURE 4 shows a modified circuit for controlling the lock-up clutch structure of FIGURE 1.

The influence of the governor pressure and the boost TV pressure can be overruled, however, by the downshift valve. Thus whenever the downshift valve is actuated upon movement of engine throttle to a fully open position, passage 244 will be pressurized so that the signal valve will assume a right hand position as viewed in the drawings. Under these conditions a forced kick down will be obtained only when the torque converter is fully operative with the lock-up clutch released. This contributes to smoothness in the downshift. Referring next to FIGURE 4, we have illustrated an alternate embodiment of the converter flow valve circuit. It includes a converter pressure regulator valve of the type described with reference to the previous embodiment. For this reason the elements of the converter regulator valve have been identified by similar reference characters although primed notations have been applied. Unlike the regulator valve of the first embodiment, however, regulator valve 250' is in fluid communication with a passage 400 that forms a portion of the converter return flow path. It is blocked by valve land 254' when the regulator element assumes a non-regulating position during the initial pressure build-up of the control system pump. Land 254' uncovers passage 400, however, when the pressure regulator valve assumes a regulating condition. The return fluid flow then is distributed to a cooler passage 402 extending to a heat exchanger or cooler 404.

Land 406 is subjected to compensator pressure that is distributed from the compensator valve to the converter pressure regulator valve through passage 222'.

High pressure passage 266' communicates with branch passages 408 and 410 which in turn communicate with a switch valve identified generally by reference character 412. This switch valve comprises a multiple land valve element 414 that is situated within a cooperating valve chamber 416. Valve lands are formed on valve element 414 at spaced locations as shown at 418, 420 and 422. An exhaust port is shown at 424.

Converter fluid passage 126' communicates with valve chamber 416 adjacent the branch passage 408. Converter flow passage 100' communicates with valve chamber 416 adjacent the branch passage 410.

A valve spring 426 normally biases valve element 414 in a right hand direction as view in the drawings.

Control pressure may be distributed to the right hand end of valve spool 414 through a passage 428 that communicates with a signal valve identified generally by reference character 490. Passage 428 also communicates with passage 292' for the purpose of augmenting the regulated pressure level maintained by the regulator valve in the manner previously described.

Signal valve 490 comprises a multiple land spool valve element 492 situated within a cooperating valve chamber 494. Element 492 is formed with valve lands 496, 498, 500 and 502. An exhaust port is shown at 503.

Control pressure equal in magnitude to the pressure on the apply side of the brake band servo is distributed to valve chamber 494 through a passage 504.

A differential area defined by the lands 500 and 502 is subjected to downshift valve pressure that is distributed to the valve chamber 494 through downshift valve pressure passage 506. That pressure, upon operation of the downshift valve, urges the valve element 492 in a right hand direction as viewed in the drawings. Governor pressure is distributed to the right hand end of valve land 502 to governor pressure passage 508.

Valve element 492 is biased normally in a right hand direction by the valve spring 510. This valve spring is situated at the left hand end of the signal reducer valve chamber 512. It communicates with the signal valve chamber and has positioned therein a reducer valve element 514. A spring 516 is disposed between element 514 and the spool valve element 492. The pressure is distributed to the left hand end of valve chamber 512 through a boost TV pressure passage 518. Element 514 reduces the magnitude of the pressure in passage 518 and distributes it to the left hand end of the valve chamber 494 through a cross over passage 520. Downshift valve pressure passage 506 also communicates with the left hand end of the chamber 494 through a branch passage 522.

Line pressure is distributed to the signal valve through a pressure passage 524. This passage is blocked when the signal valve assumes the position shown in the drawings. If the governor pressure rises for any given throttle pressure to a sufficient value, the valve spool 492 will be shifted in a left hand direction to establish communication between passages 524 and 428. At the same time communication between passage 428 and exhaust port 504 is interrupted. Under these conditions, control pressure is distributed to the right hand end of valve land 422 of the switch valve 412. This moves the switch valve element 414 in a left hand direction thereby establishing communication between passage 100′ and exhaust port 424 while simultaneously establishing communication between passage 408 and 126′. The return flow of fluid through passage 400 also is blocked by valve land 420. Branch passage 410 becomes blocked by valve land 422. Thus a reversal in the direction of flow to the converter is experienced and the lock-up clutch will become engaged in the manner previously described.

Pressure is made available to the signal valve by a phase valve identified generally by reference character 526. This valve includes a valve spool 528 having valve lands 530 and 532. Rear clutch pressure is distributed to the left hand end of the valve element 528 through passage 534 and acts upon valve land 536 situated within the phase valve chamber. Land 536 is of greater diameter than land 530 and land 532. Front brake servo apply pressure is made available to the right hand end of valve land 532 through passage 504 as indicated previously and holds the value as shown. Thus when the direct drive clutch is fully applied and the brake servo and passage 534 are pressurized at a value that may be slightly less than the ultimate line pressure that may exist when a shift is completed, the phase valve will shift in a right hand direction. This will interrupt communication between passage 524 and an exhaust port 538 to establish communication between passage 524 and a restricted branch passage 540 that communicates with passage 504. Control pressure then is distributed from passage 504 to passage 524. Upon subsequent actuation of the signal valve, the lock-up clutch either is applied or released as explained previously. The phase valve thus overrules the action of the signal valve and assures that the lockup clutch can be applied only when the rear clutch is engaged fully. This becomes of importance on a so-called "lift-foot" upshift. Such an upshift is one that takes place upon relaxation of the engine throttle following acceleration of the vehicle in the intermediate speed ratio drive range. Under these conditions the shift occurs under minimum or zero torque conditions and a minimum clutch servo pressure is required to engage the clutch fully.

Figure 5:
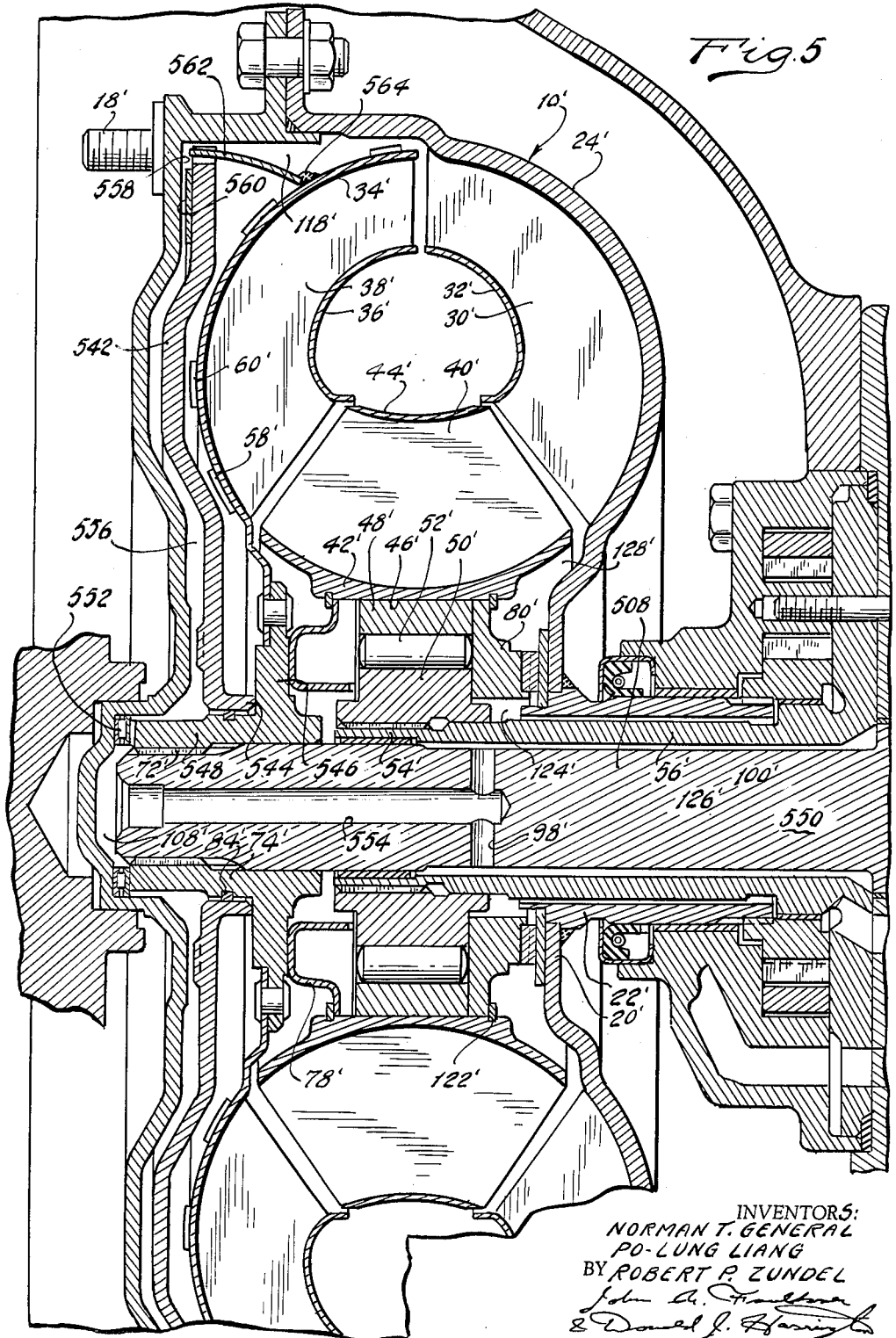
FIGURE 5 shows an alternate lock-up clutch structure.

Referring next to FIGURE 5, we have illustrated another hydrokinetic unit with a lock-up clutch arrangement. It is similar in construction to the arrangement described with reference to the previous figures. It includes a lock-up clutch member, however, that does not require the use of an auxiliary pressure chamber for initiating the pressure response. This clutch member is identified by reference character 542. The portions of the structure of FIGURE 5 that are common to the earlier figures have been identified by similar reference numerals although prime notations have been added.

Member 542 comprises a hub portion 544 that is positioned slidably upon a turbine hub 546 to which the outer turbine shroud is attached. Hub 544 is received over an extension 548 of the hub 546 and is splined internally to a turbine shaft 550 that extends to the power input element of a multiple speed ratio gear train. A thrust washer 552 is situated between extension 548 and the adjacent hub portion of the impeller drive plate.

During operation of the torque converter in the torque conversion range, fluid is supplied to the hydrokinetic torus circuit through a passage 554 which communicates with the space 556 between the drive plate of the impeller and the member 542. Fluid then passes radially outwardly past adjacent friction surfaces 558 and 560 that are formed on the drive plate and the member 542. Friction surface 560 may be obtained by using a friction clutch disc. A driving connection is established between the outer turbine shroud and the periphery of the member 542 by means of cantilever spring fingers 562. One end of each fingers 562 is welded or otherwise secured to the turbine shroud as shown at 564. The other extended ends of fingers 562 are received within cooperating radial recesses on the periphery of the member 542. Thus, the member 500 can shift axially with respect to the turbine. We contemplate that the fingers 562 will be capable of cushioning the mechanical connection that is established between the impeller and the turbine thereby preventing harsh application of the lock-up clutch.

During operation of the unit in the torque conversion range, fluid passes radially outwardly through the space defined by the adjacent friction surfaces 558 and 560. It then passes radially inwardly through the bladed passages of the turbine and through the space situated between the trailing edge of the stator shroud and the adjacent impeller shell. If the valve system reverses the direction of fluid flow in the manner previously described, a pressure drop will occur across the restriction presented by the adjacent friction surfaces 558 and 560. This pressure drop is sufficient to establish an initial differential pressure force across the member 542. As the member 542 is urged into frictional engagement with friction surface 558, however, the pressure in the space 556 drops to zero since passage 554 will be exhausted. This augments the clutch applying force. If a more perfect seal is desired between the friction surfaces 558 and 560, an annular O-ring may be disposed within a cooperating annular groove formed in the lock-up clutch friction disc.

Having thus described preferred embodiments of our invention, what we claim and desire to secure by United States Letters Patent is:

1. In a hydrokinetic torque converter unit comprising an impeller member and a turbine member disposed in a torus circuit in fluid flow relationship, said impeller member comprising a drive shell, an axially displaceable piston member connected to said turbine member and located between said turbine member and said drive shell, a first friction surface formed on a peripheral portion of said piston member, a cooperating second friction surface on said shell disposed adjacent said first friction surface and cooperating therewith to define an annular fluid flow passage of reduced area, a fluid flow passage means defined in part by the space between said shell and said piston member, and by said annular area for establishing fluid flow through said circuit, said space and said reduced area passage accommodating said fluid flow under pressure in a radially outward direction, said passage means including a return passage communicating with a radially inward part of said circuit, and valve means for reversing the direction of pressure distribution through said passage means whereby said return passage becomes pressurized and the pressure in said space becomes reduced thus causing said friction surfaces to engage under the influence of the higher pressure in the torus circuit.

2. In a hydrokinetic torque converter unit comprising an impeller member and a turbine member disposed in a torus circuit in fluid flow relationship, said impeller member comprising a drive shell, an axially displaceable piston member located in the interior of said shell, said piston member being defined in part by said turbine, a first friction surface formed on the peripheral portion of said piston member, a cooperating second frictional surface on said shell disposed adjacent said first friction surface and cooperating therewith to define an annular fluid flow passage of reduced area, a fluid flow passage means defined in part by the space between said shell and said piston member and by said annular area for distributing fluid through said circuit, said space and said reduced area passage accommodating fluid flow under pressure in a radially outward direction, said passage means including a return passage communicating with a radially inward part of said circuit, and valve means for reversing the direction of pressure distribution through said passage means whereby said return passage becomes pressurized and the pressure in said space becomes reduced thus causing said friction surfaces to engage under the influence of the higher pressure in said torus circuit.

3. In a hydrokinetic torque converter unit comprising an impeller member and a turbine member disposed in a torus circuit in fluid flow relationship, said impeller member comprising a drive shell enclosing said turbine member, a axially displaceable piston member connected to said turbine member and located between said turbine member and said drive shell, a first friction surface formed on a peripheral portion of said piston member, a cooperating second friction surface on said shell disposed adjacent said first friction surface, a fluid flow passage means defined in part by the space between said shell and said piston member for establishing fluid flow through said circuit, a turbine shaft, said turbine shaft being connected to said turbine member, a flow separator member carried by said turbine shaft, said passage means including branch portions adapted to conduct fluid in a radially outward direction on either side of said separator member, one-way fluid flow controlling means defining in part one of said branch portions for preventing fluid flow through said one branch portion in a radially inward direction, the other branch portion forming a fluid flow restriction and valve means for reversing the direction of pressure distribution through said passage means.

4. In a hydrokinetic torque converter unit comprising an impeller member and a turbine member disposed in a torus circuit in fluid flow relationship, said impeller member comprising a drive shell, a friction member connected to said turbine member at a radially outward portion thereon, a cooperating friction surface formed on said shell and situated at a radial position adjacent said friction member, a fluid flow passage means defined in part by the space between said shell and said friction member for distributing fluid flow through said circuit, said space accommodating fluid flow under pressure in a radially outward direction, said passage means including a return passage communicating with a radially inward part of said circuit, valve means for reversing the direction of pressure distribution through said passage means whereby said turbine member is shiftable in response to a pressure buildup in said circuit, a turbine shaft, a flow separator member carried by said shaft, said passage means including portions adapted to distribute fluid pressure on either side of said separator member, and one-way fluid flow controlling means for accommodating flow in a radially outward direction but inhibiting flow in a radially inward direction through one of said portions of said passage means, the other of said portions of said passage means defining a fluid flow restriction.

5. In a power transmission mechanism capable of delivering power from a driving member to a driven member, a hydrokinetic torque converter unit comprising an impeller member connected to said driving member and a turbine member connected to said driven shaft, said impeller member and turbine member being disposed in a torus circuit in fluid flow relationship, said impeller member comprising a drive shell enclosing said turbine member, an axially displaceable piston member connected to said turbine member and located between said turbine member and said drive shell, a first friction surface formed on a peripheral portion of said piston member, a cooperating second friction surface on said shell disposed adjacent said first friction surface and cooperating therewith to define an annular fluid flow passage of reduced area, a fluid flow passage means defined in part by the space between said shell and said piston member and by said reduced area passage for establishing fluid flow through said circuit, said space accommodating said fluid flow under pressure in a radially outward direction, said passage means including a return passage communicating with a radially inward part of said circuit, valve means for reversing the direction of pressure distribution through said passage means, a source of fluid pressure, conduit structure interconnecting said pressure source and said passage means, said valve means being situated in said conduit structure and including a switch valve movable between two operating positions, said switch valve establishing communication between said pressure source and said space during operation of said torque converter unit in a torque conversion range and being capable of exhausting said space when it assumes another operating position, a source of a driven member speed responsive pressure and a source of torque demand responsive pressure, and auxiliary passage means for conducting said speed responsive pressure and said torque demand responsive pressure to said switch valve to establish opposed fluid pressure actuating forces, said speed responsive pressure being adapted to urge said switch valve toward an exhaust position.

6. In a power transmission mechanism capable of delivering power from a driving member to a driven member, a hydrokinetic torque converter unit comprising an impeller member connected to said driving member and a turbine member connected to said driven shaft, said impeller member and turbine member being disposed in a torus circuit in fluid flow relationship, an axially displaceable piston member connected to said turbine member, a first friction surface formed on a peripheral portion of said piston member, said piston member being defined in part by said turbine, a cooperating second frictional surface connected to said impeller member and disposed adjacent said first friction surface, said surfaces cooperating to define an annular fluid flow passage of reduced area, a fluid flow passage means defined in part by the space between said piston member and said impeller and by said reduced area passage for distributing fluid through said circuit, said space accommodating fluid flow under pressure in a radially outward direction, said passage means including a return passage communicating with a radially inward part of said circuit, valve means for reversing the direction of pressure distribution through said passage means, a source of fluid pressure, conduit structure interconnecting said pressure source and said passage means, said valve means being situated in said conduit structure and including a switch valve movable between two operating positions, said switch valve establishing communication between said pressure source and said space during operation of said torque converter unit in a torque conversion range and being capable of exhausting said space when it assumes another operating position, a source of a driven member speed responsive pressure and a source of torque demand responsive pressure, and auxiliary passage means for conducting said speed responsive pressure and said torque demand responsive pressure to said switch valve to establish opposed fluid pressure actuating forces, said speed responsive pressure being adapted to urge said switch valve to an exhaust position.

7. In a power transmission mechanism capable of delivering power from a driving member to a driven member, a hydrokinetic torque converter unit comprising an impeller member connected to said driving member and a turbine member connected to said driven shaft, said impeller member and said turbine member being disposed in a torus circuit in fluid flow relationship, said impeller member comprising a drive shell enclosing said turbine member, an axially displaceable piston member connected to said turbine member and located between said turbine member and said drive shell, a first friction surface formed on a peripheral portion of said piston member, a cooperating second friction surface on said shell disposed adjacent said first friction surface, a fluid flow passage means defined in part by the space between said shell and said piston member for establishing fluid flow through said circuit, a turbine shaft, said turbine shaft being connected to said turbine member, a flow separator member carried by said turbine shaft, said passage means including branch portions adapted to conduct fluid in a radially outward direction on either side of said separator member, one-way fluid flow controlling means defining in part one of said branch portions for preventing fluid flow through said one branch portion in a radially inward direction, the other branch portion forming a fluid flow restriction, valve means for reversing the direction of pressure distirbution through said passage means, a source of fluid pressure, conduit structure interconnecting said pressure source and said passage means, said valve means being situated in said conduit structure and including a switch valve movable between two operating positions, said switch valve establishing communication between said pressure source and said space during operation of said torque converter unit in a torque conversion range and being capable of exhausting said space when it assumes another operating position, a source of a driven member speed responsive pressure and a source of torque demand responsive pressure, an auxiliary passage means communicating with said sources for conducting said speed responsive pressure and said torque demand responsive presusre to said switch valve to establish opposed fluid pressure forces, said speed responsive pressure being adapted to urge said switch valve to an exhaust position.

8. In a power transmission mechanism capable of delivering power from a driving member to a driven member, a hydrokinetic torque converter unit comprising an impeller member connected to said driving member and a turbine member connected to said driven shaft, said impeller member and said turbine member being disposed in a torus circuit in fluid flow relationship, said impeller member comprising a drive shell, a friction member carried by said turbine member at a radially outward portion thereon, a cooperating friction surface formed on said shell and situated at a radial position adjacent said friction member, a fluid flow passage means defined in part by the space between said shell and said friction member for distributing fluid flow through said circuit, said space accommodating fluid flow under pressure in a radially outward direction, said passage means including a return passage communicating with a radially inward part of said circuit, valve means for reversing the direction of pressure distribution through said passage means whereby said turbine member is shifted in response to a pressure buildup in said circuit, a turbine shaft, a flow separator member carried by said shaft, said passage means including branch portions adapted to distribute fluid pressure on either side of said separator member, one-way fluid flow controlling means defining in part one of said branch portions for preventing fluid flow through said one branch portion in a radially inward direction, the other branch portion forming a fluid flow restriction, said flow controlling means accommodating flow in a radially outward direction but inhibiting flow in a radially inward direction, a source of fluid pressure, conduit structure interconnecting said pressure source and said passage means, said valve means being situated in said conduit structure and including a switch valve movable between two operating positions, said switch valve establishing communication between said pressure source and said space during operation of said torque converter unit in a torque conversion range and being capable of exhausting said space when it assumes another operating position, a source of a driven member speed responsive pressure and a source of torque demand responsive pressure, and auxiliary passage means for conducting said speed responsive pressure and said torque demand responsive pressure to said switch valve to establish opposed fluid pressure forces.

9. In a power transmission mechanism having gear elements capable of forming a torque delivery path from a driving member to a driven member, a hydrokinetic torque converter unit comprising an impeller member connected to said driving member and a turbine member connected to a power input gear element, a power output gear element being connected to said driven member, said impelled member and turbine member being disposed in a torus circuit in fluid flow relationship, pressure operated clutch and brake means for controlling the relative motion of said gear elements to establish selectively multiple speed ratios, said impeller member comprising a drive shell enclosing said turbine member, an axially displaceable piston member connected to said turbine member, a first friction surface carried by said piston member, a cooperating second friction surface on said shell disposed adjacent said first friction surface and cooperating therewith to define an annular fluid flow passage of reduced area, a fluid flow passage means defined in part by the space between said shell and said piston member and by said reduced area passage for establishing fluid flow through said circuit and exhausting fluid from said circuit, said space accommodating said fluid flow under pressure in a radially outward direction, said passage means including a return passage communicating with a radially inward part of said circuit, valve means for reversing the direction of pressure distribution through said passage means whereby said return passage becomes pressurized and the pressure in said space becomes reduced thus causing said friction surfaces to engage under the influence of the higher pressure in said torus circuit, a source of fluid pressure, conduit structure interconnecting said pressure source and said passage means, said valve means being situated in said conduit structure and including a switch valve movable between two operating positions, said switch valve establishing communication between said pressure source and said space during operation of said torque converter unit in a torque conversion range and being capable of exhausting said space when it assumes another operating position, a source of a driven member speed responsive pressure and a source of torque demand responsive pressure, an auxiliary passage means for conducting said speed responsive pressure and said torque demand responsive pressure to said switch valve to establish opposed fluid pressure forces, and phase valve means for establishing communication between said return passage and said pressure source in response to a pressure build-up in a high speed ratio clutch portion of said gear element controlling means.

10. In a power transmission mechanism having gear elements capable of forming a torque delivery path from a driving member to a driven member, a hydrokinetic torque converter unit comprising an impeller member connected to said driving member and a turbine member connected to a power input gear element, a power output gear element being connected to said driven member, said impeller member and turbine member being disposed in a torus circuit in fluid flow relationship, pressure operated clutch and brake means for controlling the relative motion of said gear elements to establish selectively multiple speed ratios, said impeller member comprising a drive shell, an axially displaceable piston member connected to said turbine member, said piston member being defined in part by said turbine, a first friction surface carried by said piston member, a cooperating second frictional surface on said shell disposed adjacent said first said friction surface, and cooperating therewith to define a fluid flow passage of reduced area, a fluid flow passage means defined in part by the space between said shell and said piston member and by said reduced area passage for distributing fluid through said circuit and exhausting fluid from said circuit, said space accommodating fluid flow under pressure in a radially outward direction, said passage means including a return passage communicating with a radially inward part of said circuit, valve means for reversing the direction of pressure distribution through said passage means, a source of fluid pressure, conduit structure interconnecting said pressure source and said passage means, said valve means being situated in said conduit structure and including a switch valve movable between two operating positions, said valve establishing communication between said pressure source and said space during operation of said torque converter unit in a torque conversion range and being capable of exhausting said space when it assumes another operating position, a source of a driven member speed responsive pressure and a source of torque demand responsive pressure, an auxiliary passage means for conducting said speed responsive pressure and said torque demand responsive pressure to said switch valve to establish opposed fluid pressure forces, and phase valve means for inhibiting the function of said reversing valve means in response to a pressure decrease in a high speed ratio clutch portion of said gear element controlling means.

References Cited by the Examiner

UNITED STATES PATENTS

| | | | |
|---|---|---|---|
| 923,613 | 6/1909 | Atwood | 192—52 |
| 2,146,042 | 2/1939 | Wolfram | 192—52 |
| 2,707,887 | 5/1955 | Slack | 74—645 |
| 2,793,726 | 5/1957 | Jandasek | 192—3.2 |
| 2,884,806 | 5/1959 | Tuck | 74—645 |
| 2,919,597 | 1/1960 | Borman. | |
| 2,992,713 | 7/1961 | Stump et al. | 192—3.2 |
| 3,078,736 | 2/1963 | Meads et al. | |

FOREIGN PATENTS

| | | |
|---|---|---|
| 932,698 | 7/1963 | Great Britain. |

DON A. WAITE, *Primary Examiner.*

THOMAS C. PERRY, *Assistant Examiner.*